US012693191B2

(12) United States Patent
Lewis et al.

(10) Patent No.: US 12,693,191 B2
(45) Date of Patent: Jul. 28, 2026

(54) AUTOMATED PROBE FOCAL DISTANCE MEASUREMENT SYSTEM AND METHOD

(71) Applicant: Endress+Hauser Optical Analysis, Inc., Ann Arbor, MI (US)

(72) Inventors: Mary Lewis, Ann Arbor, MI (US); Jeremy David Preister, Fenton, MI (US); Ian Lewis, Ann Arbor, MI (US)

(73) Assignee: Endress+Hauser Optical Analysis, Inc., Ann Arbor, MI (US)

( * ) Notice: Subject to any disclaimer, the term of this patent is extended or adjusted under 35 U.S.C. 154(b) by 142 days.

(21) Appl. No.: 18/600,152

(22) Filed: Mar. 8, 2024

(65) Prior Publication Data

US 2025/0283779 A1      Sep. 11, 2025

(51) Int. Cl.
G01M 11/02 (2006.01)

(52) U.S. Cl.
CPC ............................... G01M 11/0207 (2013.01)

(58) Field of Classification Search
CPC .......... G01M 11/0207; G01M 11/0228; G01B 11/14; G01B 11/026; G01J 3/02; G01J 3/0208; G01J 3/0237; G01J 3/027; G01J 3/0278; G01J 3/0291; G01J 3/44
See application file for complete search history.

(56) References Cited

U.S. PATENT DOCUMENTS 6,757,060 B2      6/2004  Davis et al.
2010/0141965 A1*    6/2010  Schneider ............... B24B 49/12
                                        356/621

2015/0245769 A1*   9/2015  Mimura ........... A61B 1/000095
                                        600/477
2016/0169660 A1*   6/2016  Shafer ................ G02B 17/0856
                                        356/326
2022/0082435 A1      3/2022  Sobron et al.
2023/0194346 A1*   6/2023  Grenov .................. G02B 21/36
                                        356/300
2025/0093254 A1*   3/2025  Behr .................. G01N 15/1459

FOREIGN PATENT DOCUMENTS

CN        101408478  B1      7/2010
CN        106500843  B1      4/2018
DE     102014107044  B4      1/2016
JP        2008014657  A      1/2008

* cited by examiner

*Primary Examiner* — Tarifur R Chowdhury
*Assistant Examiner* — Akbar H. Rizvi
(74) *Attorney, Agent, or Firm* — Christopher R. Powers; Endress+Hauser (USA) Holding, Inc.

(57)      ABSTRACT

A measurement system for a focal distance measurement of an optic includes: a translation stage including a base and platform configured to translate in linear motion relative to each other in an automated manner driven by a linear actuator; a reference material disposed on the translation stage and having a surface opposite the optic to be measured; a measuring device configured to measure a gap between the surface of the reference material and a distal tip of the optic in an automated manner; a spectrometer in optical communication with the optic; and a controller configured to operate the translation stage, the measuring device, and the spectrometer and to determine a focal distance of the optic based on a spectral characteristic of a measurement spectrum and on a final gap between the surface of the reference material and the distal tip of the optic at which the spectral characteristic is determined.

22 Claims, 4 Drawing Sheets

AUTOMATED PROBE FOCAL DISTANCE MEASUREMENT SYSTEM AND METHOD

TECHNICAL FIELD

The present disclosure generally relates to an optical probe assembly and, in particular, to optic assemblies for spectroscopic analysis.

BACKGROUND

Spectrometers, such as dispersive spectrometers, are included in, e.g., absorption measurement instruments, vibrational spectroscopy measurement instruments, non-rotational spectroscopy techniques, and Raman spectroscopic measurement instruments, which are currently employed in a large variety of different applications, including industrial and laboratory applications, to determine and to provide measurement results of various measurands of a medium. As an example, absorption spectra of a medium determined by a dispersive spectrometer of an absorption measurement device are employed to determine and to provide measurement results of concentrations of components included in the medium, a turbidity of the medium and/or at least one other measurand. As another example, Raman spectra of a sample of the medium determined by a dispersive spectrometer of a Raman spectroscopic measurement device are employed to determine and to provide measurement results of concentrations of components included in the medium, a pH-value of the medium, a melt index of the medium, a cell motility of the medium, and/or at least one other measurand. Raman spectroscopy has become a powerful tool for use in conjunction with in situ process analysis.

Dispersive spectrometers commonly include a disperser, e.g., a diffractive or holographic grating, dispersing incident light, and a detector including an array of detection elements, e.g., a CCD camera, an array of photodiodes, or another type of detector array. The detection elements are arranged such that each detection element receives a different fraction of the dispersed light and determines and provides a detection signal corresponding to an intensity of the received fraction of the dispersed light. The detection signals are, e.g., provided to a signal processor determining and providing spectral intensity values of the intensity spectra of the light received by the detector based on the detection signals.

Raman spectroscopy is based on the effect known as Raman scattering. Raman scattering is a type of inelastic scattering of electromagnetic radiation, such as an excitation light from a laser, when traversing a medium. The effect can be summarized as follows. Most of the incident photons of the excitation undergo elastic scattering (termed Rayleigh scattering) resulting in the scattered radiation having the same wavelength as the incident radiation. A small minority of the incident photons, however, undergo inelastic scattering resulting in emitted photons having lower or higher energy, thus leading to emitted wavelengths (e.g., frequencies) above and/or below the incident radiation, referred to as a Raman shift.

The inelastic, Raman scattering is caused by a selective interaction between the incident radiation and the molecules, which is specific for each chemical bond. The wavelength shift (i.e., Raman shift) observed in the inelastically scattered radiation can be collected and separated from the intense Rayleigh scattered light to generate information about the composition of the medium, for example, the concentration of a specific molecule. However, due to the small fraction of radiation experiencing the Raman shift, the resulting signal is relatively weak. Consequently, proper focus of the excitation light at or about the nominal design focal point or area is required to maximize the strength, and thereby effect, of the excitation light on a sample of the medium to be interrogated and to maximize the strength of the signal (e.g., the signal-to-noise ratio, SNR) within the collected light. Moreover, poor optic focus may cause chromatic aberration of the signal.

Further, probe optics are generally designed to have a specified focal distance, but the true focal distance must be measured after manufacturing the probe to get a precise number and determine if the probe is built within quality control specifications. For at least these reasons, manufacturers of such optical probes may perform a quality check of a focal distance of the probe to confirm the probe assembly is within a design specification. Conventionally, such quality checks are highly labor intensive, requiring a skilled operator using manual adjustment to determine the true focal distance and manual data recording.

Accordingly, there remains a need for further contributions in this area of technology.

SUMMARY

In at least one aspect of the present disclosure, a measurement system for a focal distance measurement of an optic to be measured, includes: a translation stage including a base and a platform configured to translate relative to each other and connected via a guide such that the platform is restricted to linear motion relative to the base along an axis of the guide, wherein the translation stage further includes a linear actuator configured to move the platform along the axis in an automated manner; a reference material disposed on the base of the translation stage and having a surface opposite the optic to be measured; a measuring device configured to measure a gap between the surface of the reference material and a distal tip of the optic to be measured in an automated manner; a spectrometer in optical communication with the optic; and a controller configured to operate the translation stage, the measuring device, and the spectrometer and to determine a focal distance of the optic based on a spectral characteristic of a measurement spectrum generated by the spectrometer and on a final gap between the surface of the reference material and the distal tip of the optic at which the spectral characteristic is determined. The spectral characteristic is based on at least one of a maximum intensity, a band peak ratio, a band area, and a band area ratio.

In an embodiment, the controller is configured to determine the final gap based on an initial gap between the surface of the reference material and the distal tip of the optic, which defines a start point, and on a net travel distance of the platform from the start point. In a further embodiment, the controller is configured to determine the final gap based on a measured value of the measuring device.

In an embodiment, the measuring device includes a first optical micrometer operable to generate a first light curtain between a first light source unit and a first receiver unit disposed on opposing sides of the translation stage, the first optical micrometer configured such that a first portion of the first light curtain intersects the reference material and the optic, wherein the first receiver unit is configured to measure the initial gap from a second portion of the first light curtain, which is incident on the first receiver unit.

In certain such embodiments, the measuring device includes a second optical micrometer arranged in the same plane as, but at an angle to, the first optical micrometer, the second optical micrometer operable to generate a second light curtain between a second light source unit and a second receiver unit disposed on opposing sides of the translation stage, wherein the second light curtain is at the angle relative to the first light curtain, wherein the second optical micrometer is configured such that a first portion of the second light curtain intersects the reference material and the optic, wherein the second receiver unit is configured to determine the final gap from a second portion of the second light curtain, which is incident on the second receiver unit.

In a further embodiment, the linear actuator is a stepper motor, and wherein the controller is configured to determine the net travel distance by calculating a net quantity of steps of the stepper motor taken from the start point to the final gap. In such an embodiment, the linear actuator is operable to an accuracy of 5 microns ($\mu$m) such that the determined focal distance is accurate within 12.5 $\mu$m.

In an embodiment, the translation stage is configured with one degree of freedom.

In another aspect of the present disclosure, a method for measuring a focal distance of an optic in an automated manner includes: providing the measurement system according to the present disclosure; translating the optic to be measured via the platform to a start point, wherein the start point defines an initial gap between the distal tip of the optic and the reference material; transmitting excitation light onto the surface of the reference material such that measurement light is scattered, emitted and/or absorbed from the reference material; collecting the measurement light, conveying the measurement light to the spectrometer, and generating a measurement spectrum of the collected measurement light; translating the platform in a first direction using feedback from the spectrometer while sequentially and repeatedly transmitting the excitation light, collecting the measurement light, and generating the measurement spectrum until a prescribed spectral characteristic of the measurement spectrum is determined; translating the platform in an opposite, second direction using feedback from the spectrometer until the spectral characteristic is determined in the second direction; and determining the focal distance of the optic based on a final gap between a distal tip of the optic and the surface of a reference material at which the spectral characteristic is determined.

An embodiment of the present disclosure further includes determining the final gap based on the initial gap at the start point and on a net travel distance of the platform from the start point.

In certain embodiments in which the linear actuator of the translation stage is a stepper motor configured to translate the optic via the platform in incremental steps, the net travel distance is calculated by counting a net quantity of steps of a stepper motor taken from the start point to the final gap in the first direction relative to the second direction. In certain such embodiments, the incremental steps are larger in the first direction than in the second direction.

In an embodiment, the start point is specified and is determined by measuring the initial gap using the measuring device. In a further embodiment, the start point is selected to be greater than a design nominal focal distance of the optic. In a yet further embodiment, the start point is selected such that the first direction is toward the base of the translation stage. In a yet further embodiment, the start point is selected such that the first direction extends away from the base of the translation stage.

At least one embodiment further includes: comparing the determined focal distance to a specified focal range for the optic; and generating a message when the determined focal distance is beyond the specified range. At least one embodiment includes generating a message when the determined focal distance is within the specified range. At least one embodiment includes recording the determined focal distance of the optic.

In another aspect of the present disclosure, a computer program product for operating a measurement system of the present disclosure includes a non-transitory machine-readable storage medium encoding instructions that, when executed by one or more programmable processors of the controller, cause the one or more programmable processors to perform operations including: translating the optic to be measured via the platform to a start point; transmitting excitation light onto the surface of the reference material such that measurement light is scattered, emitted, and/or absorbed from the reference material; collecting the measurement light, conveying the measurement light to the spectrometer, and generating a measurement spectrum of the collected measurement light; translating the platform in a first direction using feedback from the spectrometer while sequentially and repeatedly transmitting the excitation light, collecting the measurement light, and generating the measurement spectrum until a prescribed spectral characteristic of the measurement spectrum is determined; translating the platform in an opposite, second direction using feedback from the spectrometer until the spectral characteristic is determined in the second direction; and determining the focal distance of the optic based on a final gap between a distal tip of the optic and the reference material at which the spectral characteristic is determined.

BRIEF DESCRIPTION OF THE DRAWINGS

The described embodiments and other features, advantages and disclosures contained herein, and the manner of attaining them, will become apparent and the present disclosure will be better understood by reference to the following description of various embodiments of the present disclosure taken in junction with the accompanying drawings, wherein.

Figure 1:
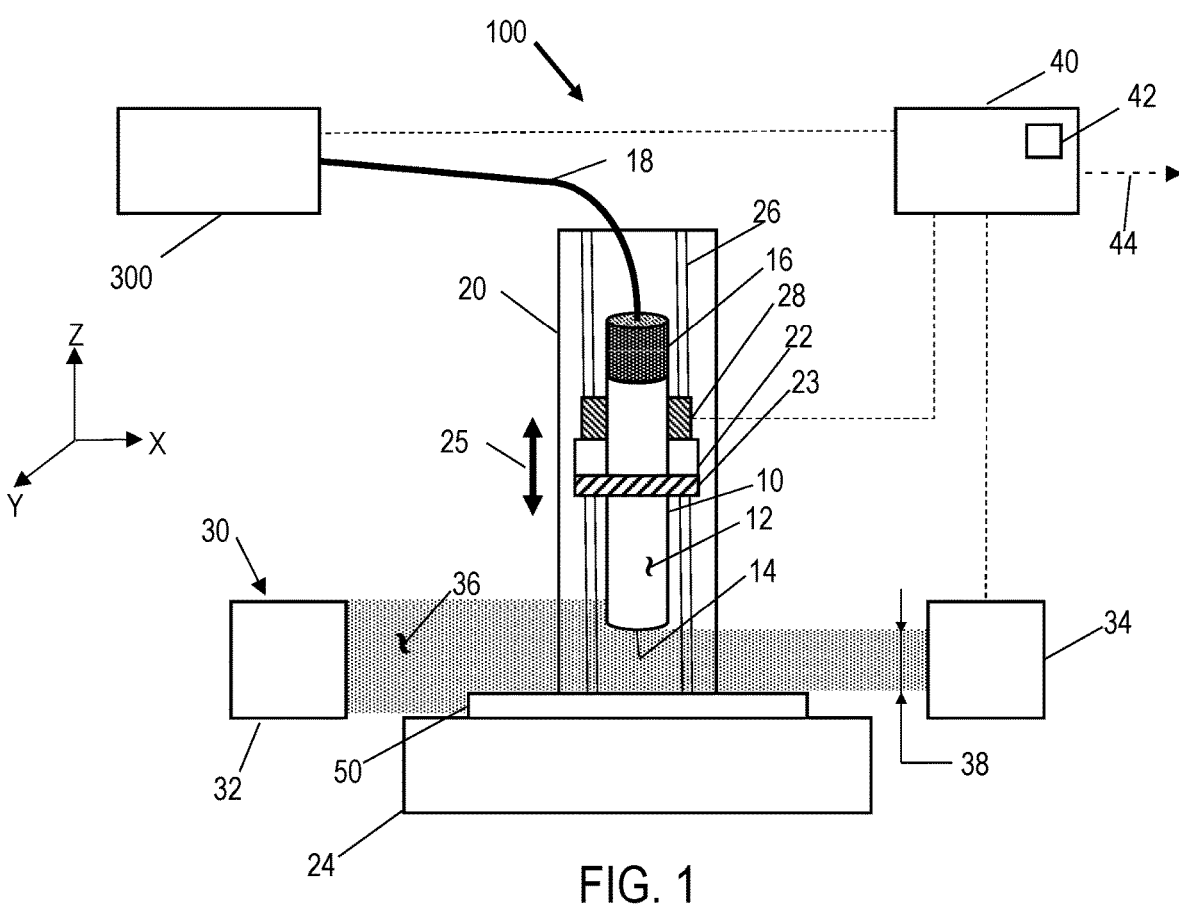
FIG. 1 shows a schematic of an embodiment of a measurement system according to the present disclosure.

In the figures, the same features are identified by the same reference signs.

DETAILED DESCRIPTION

The present disclosure discloses various embodiments of a focal distance measurement system for optical probes and methods for using the same. According to one aspect of the present disclosure, a focal distance measurement system for an optical probe configured for Raman spectroscopy is disclosed. According to a further aspect of the present disclosure, a method of performing a measurement of the focal distance of an optical probe configured for Raman spectroscopy using the measurement system is disclosed. Though the focal distance measurement system and methods for using the same are described in the context of Raman spectroscopy, it will be understood the structures and methods disclosed herein may be applied to optical probes configured for other types of spectroscopy and analytic optical sensors, for example, absorption spectroscopy and vibrational spectroscopies generally.

The systems and methods of the present disclosure are applicable to optical probes having different design focal distances, depending on the intended application of the probe. For example, probes engineered for bioprocessing applications may have relatively short focal distances, and an overall length of such a probe may be relatively short. Moreover, probes engineered for industrial chemical applications (sometimes referred to as "immersion optics") may have relatively long focal distances and a relatively long overall length. The terms probe, optical probe, optic, and end optic are, at times, used interchangeably in the present disclosure, as will be understood by those skilled in the art.

For the purposes of promoting an understanding of the principles of the present disclosure, reference will now be made to the embodiments illustrated in the drawings, and specific language will be used to describe the same. It will nevertheless be understood no limitation of the scope of this disclosure is thereby intended.

FIG. 1 shows a measurement system 100 for a focal distance measurement of an optic 10, for example, an optic of a probe head or, more generally, an optical probe, to be measured according to at least one embodiment of the present disclosure. The measurement system 100 includes a translation stage 20 upon which an optic 10, whose focal distance is to be measured, can be rigidly and reversibly mounted. The translation stage 20 may include a base 24 and a platform 22 that are configured to translate relative to each other and are connected via one or more guides 26 such that the platform 22 is restricted to linear motion relative to the base 24. The measurement system 100 includes a reference material 50 disposed on the base 24, the reference material 50 having a surface facing the optic 10 such that light emitted from the optic 10 is incident on the surface.

In at least one embodiment according to the present disclosure, the measurement system 100 includes a spectrometer 300 in optical communication with optic 10 to be measured via an optical fiber 18, as shown in FIG. 1. The fiber 18 may be reversibly connected to the optic 10 with a connector 16 at one end and to the spectrometer 300 at the other end by a similar or different connector. The spectrometer 300 is operable to generate and transmit excitation light to the optic 10 and to receive and operate on a measurement light from the optic 10, both via the fiber 18.

The measurement system 100 includes at least one measuring device 30 configured to measure a gap 38 between surface of the reference material 50 and a distal tip 14 of the optic 10 to be measured in an automated manner. In at least one embodiment, as shown in FIG. 1, the measuring device 30 may be an optical micrometer (e.g., precision laser micrometer, laser caliper) operable and configured to generate a light curtain 36 between a light source unit 32 and a receiver unit 34 of the optical micrometer, which are disposed on opposing sides of the translation stage 20 such that a first portion of the light curtain 36 intersects and is blocked by the reference material 50 and the optic 10. In such a configuration, the receiver unit 34 is configured to measure the gap 38 based on a second portion of the light curtain 36 that is incident on the receiver unit 34. In at least one embodiment, the light source unit 32 and a receiver unit 34 may be mounted to a common rail, which supports each unit 32, 34 and fixes their relative position to each other and to the translation stage 20.

In at least one embodiment according to the present disclosure, the measurement system 100 includes a controller 40 in communication (e.g., digital communication) with the translation stage 20, the spectrometer 300, and the at least one measuring device 30. The controller may be configured to operate the translation stage 20, the measuring device 30, and the spectrometer 300 and to determine a focal distance of the optic 10 based on a spectral characteristic (e.g., a maximum intensity) of a spectral signal from the reference material 50 detected by the spectrometer 300 and on a final gap 38 between the surface of the reference material 50 and the distal tip 14 of the optic 10 at which the maximum intensity is detected.

The controller 40 may be configured to perform certain operations comprising a control structure to provide the functions described herein. In certain embodiments, the controller 40 forms a portion of a processing subsystem that includes one or more computing devices having memory 42, processing, and/or communication hardware 44. For example, a processor of the spectrometer 300, and/or its functions, may be included in the controller 40. The controller 40 may be a single device or a distributed device, and the functions of the controller 40 may be performed by hardware and/or software. The controller 40 can include one or more arithmetic logic units (ALUs), central processing units (CPUs), memories, limiters, conditioners, filters, format converters, or the like which are not shown to preserve clarity. In at least one embodiment, the controller 40 is programmable to execute algorithms and process data in accordance with operating logic that is defined by programming instructions, such as software or firmware. Alternatively or additionally, operating logic for the controller 40 can be at least partially defined by hardwired logic or other hardware, for example, using an application-specific integrated circuit (ASIC) of any suitable type. The controller 40 can be exclusively dedicated to the functions described herein or may be further used in the regulation, control, and activation of one or more other subsystems or aspects of the measurement system and method of the present disclosure.

The translation stage 20 further includes a linear actuator 28 connected to the platform 22 and configured and operable to move (e.g., translate) the platform 22 within the guide 26 along the axis 25 in an automated manner based on commands from the controller 40. In at least one embodiment, the controller 40 is in communication with the linear actuator 28 and configured to control the linear actuator 28 so as to determine a travel distance, a position, a start point and, generally, a current location of the platform 22. The linear actuator 28 may be a stepper motor that drives a screw shaft in fixed increments called steps. In such a linear actuator 28, the travel distance of the screw shaft, and thus the platform 22, per incremental step depends on the resolution of the stepper motor. For example, certain commercially available motors are capable of half steps at 1 µm/pulse (micron per pulse) with a positional accuracy of 5 µm, a repeatability of 3 µm, a backlash of 3 µm, and a total range of 35 mm. A minimum resolution of the linear actuator 28 is in the range of ±10 µm, and at least ±12.5 µm. In a further embodiment, the linear actuator 28 may be a piezoelectric motor configured to move the platform via an applied voltage or electric field.

The translation stage 20 may further include a mount 23 (e.g., a holder mechanism such as a collar and set screw, a spring-load or friction-fit latch, or other suitable mechanism) that is configured to rigidly and reversibly fix the optic 10 to the platform 22. The mount 23 may include indexing or datum surfaces configured to interface with a probe body 12 of the probe 10 as to enable repeatable and reproduceable positioning and retention of the probe 10 relative to the platform 22.

In at least one embodiment of the translation stage 20, the platform 22 is restricted to linear motion (e.g., one degree of freedom) relative to the base 24 along an axis 25 of the guide 26. For example, the platform 22 and base 24 may be arranged as to be orthogonal to each other. In at least one embodiment, as shown in FIG. 1, the base 24 is oriented horizontally, and the platform 22 is oriented vertically, e.g., in the z-axis of the xyz-coordinate system shown in FIG. 1. In such an embodiment, the at least one guide 26 may be oriented vertically, thereby restricting the linear motion of the platform 22 to a vertical motion along an axis 25 of the guide 26. Such an embodiment of the translation stage 20 is commonly called a z-axis stage, and the base 24 is stationary, e.g., does not translate. In alternative embodiments, the base 24 may be oriented vertically, and the platform 22 may be oriented horizontally, e.g., in the x-axis, restricted to horizontal linear motion.

The guide 26 may include a type of linear bearing operable to stably, repeatably and reliably restrict the platform 22 to linear motion. By way of non-limiting example, the guide 26 may include at least one roller (e.g., ball bearing and crossed-roller bearing) slide, cylindrical sleeve, dovetail track, or flexure mechanism, in which elastic deformation of a material of the mechanism enables the translation.

In the context of the present disclosure, the optic 10 to be measured may include an assembly of one or more lenses fixed within the probe body 12, which includes an internal volume in which the one or more lenses are disposed. The optic 10 may include other optical components (not shown in FIG. 1) fixed within the probe body 12 such as, for example: a collimating lens to collimate excitation light entering the optic 10, e.g., via an optical fiber (e.g., the optical fiber 18), along a beam path within the probe body 12; one or more bandpass filters to remove undesired wavelengths generated en route from a light source generating the excitation light (e.g., those induced by the optical fiber conveying the excitation light from the light source) and/or to remove Rayleigh scattered light, having the same wavelength as the excitation light, after the excitation laser light interacts with the analyte; and an objective lens configured to focus the excitation light from the beam path into or onto a sample to be interrogated and/or irradiated at a focus point or area, which is a defined, external focal distance from a distal tip 14 of the optic 10, e.g., an outer surface of the objective lens or a transparent window of the optic 10 distal of the objective lens. In at least one embodiment, the optic 10 may be an end optic (or simply an "optic") of a greater probe assembly, to which the end optic may be connected physically and optically.

The optic 10 is configured to collect light scattered by or emitted from the sample, resulting from the incident excitation light, and direct the collected light through probe body 12. In certain embodiments, the lenses of the optic 10 may both focus the collimated excitation light into the sample and collimate the collected light from the sample into a counter-propagating beam path within probe body 12. The collected light, herein referred to as measurement light, may then be conveyed to the spectrometer 300 for spectral detection.

Figure 3:
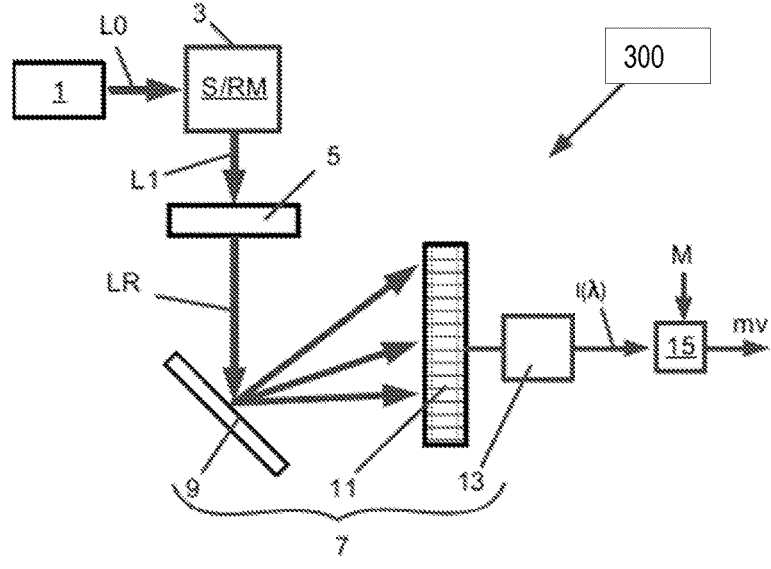
FIG. 3 shows a schematic of a spectrometer.

An exemplary and non-limiting schematic of a spectrometer suitable for the measurement systems and methods of the present disclosure is shown in FIG. 3. For example, the spectrometer 300 may include a monochromatic light source 1, e.g., a laser, configured to transmit the excitation light L0 having an excitation wavelength 20 to a measurement region 3 configured to accommodate a sample S of a medium. In the context of the present disclosure, the sample S is the reference material 50, and the measurement region 3 is the base 24 of the translation stage 20 upon which the reference material 50 rests. In certain embodiments, the excitation wavelength 20 is, e.g., a wavelength in the visible or near infrared wavelengths range. As a non-limiting example, the excitation wavelength 20 is, e.g., a wavelength from 400 nm to 1300 nm, possibly 1064 nm, 993 nm, 785 nm, 632.8 nm, 532 nm, 405 nm or another wavelength in the visible or near infrared wavelength range.

In certain embodiments, the spectrometer 300 may include a filter 5, e.g., a notch-filter, configured to filter out a measurement signal LR included in measurement light L1 emanating from the measurement region 3.

The spectrometer 300 further includes a spectrometric unit 7 configured to receive measurement signal LR emanating from the illuminated sample S and configured to determine and to provide intensity spectra $I(\lambda)$ of the measurement signal LR in a spectral measurement range $\Delta\lambda$ of the spectrometer 300.

In certain embodiments, the spectrometric unit 7 includes a disperser 9, e.g., a diffractive or holographic grating, configured to disperse the incident measurement signal LR, a detector 11, e.g., an array of charge coupled devices (CCD) or an array of photodiodes, e.g., silicon photodiodes or avalanche photodiodes, configured to receive the dispersed measurement signal LR, and a signal processor 13, e.g., a microprocessor, connected to the detector 11. The detector 11 is configured to determine and to provide detector signals corresponding to the spectral intensities of the incident dispersed measurement signal LR. The signal processor 13 is configured to determine and to provide intensity spectra $I(\lambda)$ of the measurement signal LR based on the detector signals. In certain embodiments, the spectrometer 300 may be configured to be operable for Raman or other spectroscopic techniques, such as Fourier-transform infrared spectroscopy (FT-IR), absorbance, or UV. Any spectrometer operable to capture variation in intensity from an optic required to focus incoming (e.g., excitation) light on an analyte may be suitable for use in the measuring systems and methods of the present disclosure.

According to at least one embodiment of the present disclosure, the optic 10 is specifically configured for Raman spectroscopy, and the spectrometer 300 is a Raman spectrometer configured for Raman spectroscopic analysis. In such an embodiment, during measurement of the focal distance of the optic 10, the reference material 50 is positioned in the measurement region 3 (e.g., on the base 24) and illuminated by the light source 1. In this case, the measurement signal LR is Raman scattered light emanating from the irradiated reference material 50, and the intensity spectra $I(\lambda)$ provided by the spectrometric unit 7 are Raman spectra of the reference material 50. The thus determined Raman spectra are, e.g., provided to the controller 40, which determines and provides measurement results mv of the intensity values of the intensity spectra $I(\lambda)$ based on a previously determined model M of the reference material 50 for determining the measurement results mv based on spectral intensities of Raman spectra provided by the spectrometric unit 7. To this extent, the controller 40 is either an integral part of the Raman spectrometer 300 or an external unit configured to receive the intensity spectra I(λ) determined by the spectrometric unit 7, as shown in FIG. 1. In either case, the controller 40 is, e.g., connected to or in communication with the spectrometric unit 7.

Figure 4:
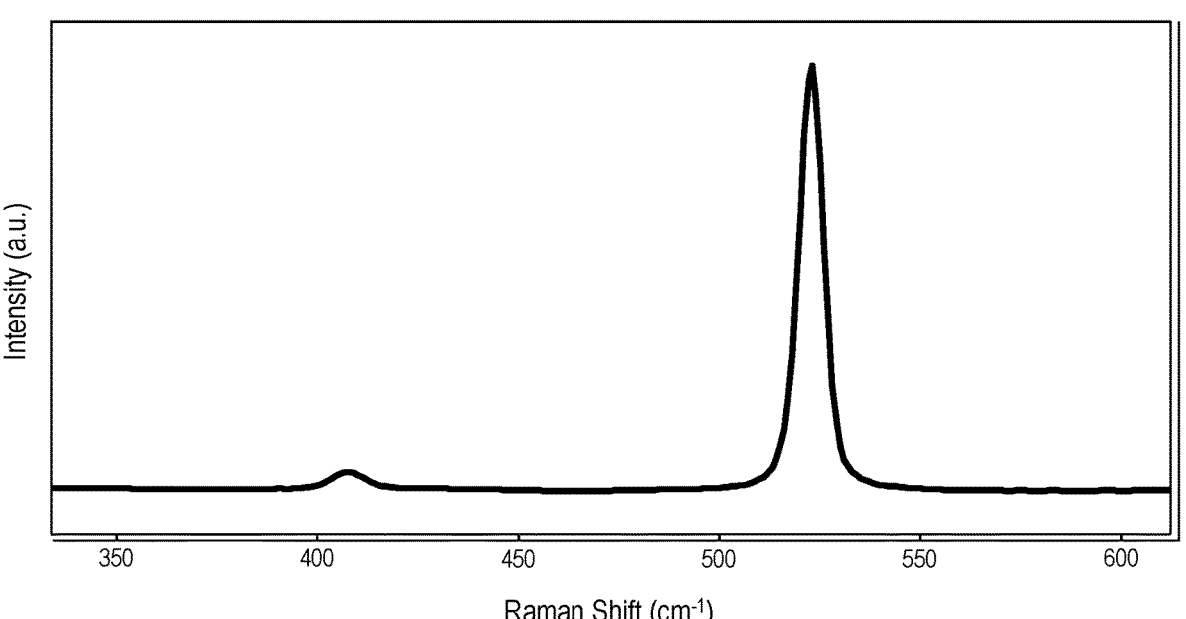
FIG. 4 shows an exemplary Raman signal spectrum of a silicon reference material as intensity (arbitrary unit) by Raman shift ($cm^{-1}$)

The reference material 50 may be any suitable substance that exhibits a distinct spectral peak intensity and can be formed in a very flat wafer (e.g., a plate or disk). Having a distinct maximum intensity peak enables good resolution of the focal distance measurement. Non-limiting examples of suitable reference materials include silicon, and diamond, e.g., synthetic diamond. FIG. 4 shows an exemplary intensity spectrum (in arbitrary units) of a Raman signal from a silicon wafer reference material using 785 nm excitation, though the spectrometer 300 may be based on any suitable light source wavelength for excitation known to one of skill in the art of the present disclosure. The distinct maximum intensity peak at 520 wavenumbers (cm$^{-1}$) enables good resolution of the focal distance measurement. When the optic is not in focus, an energy density of the excitation light L1 in the measurement region 3 is lowered, and the resulting maximum (e.g., peak) intensity of the spectral signal may be decreased, or relative intensities at different wavelengths within the spectrum (e.g., band area, peak ratio and band area ratio) may be distorted. For example, in the case of FIG. 4, a band area under the peak intensity may be distorted relative a nominal band area at true focus.

In embodiments in which the optic 10 includes an exterior window that generates its own spectral signal (e.g., a distinct peak(s) intensity separate (e.g., having a different Raman shift) from the peak(s) of the reference material 50) within the measurement signal LR, a ratio of the intensities at the respective wavelengths or a ratio of the band area under those peak intensities may be used to determine the focal distance of the optic 10. Band peak ratio and band area ratio may also be determined with respect to the reference material 50 alone, e.g., where the reference material 50 exhibits two or more localized peak intensities (e.g., bands) at disparate wavelengths. For example, as shown in FIG. 4, silicon exhibits a second, smaller peak at about 405 cm-1. Ratios of the peak intensities and/or band areas of the two peaks could be the spectral characteristic for determining the focal distance.

As used in the context of the present disclosure, such spectral features (e.g., peak intensity, band peak ratio, band area, and band area ratio) are referred to as spectral characteristics of the measurement spectrum. The spectral characteristic may be selected with respect to the reference material 50 and its spectral features at a given wavelength of the excitation light L0. In certain embodiments, the spectral characteristic may be selected further with respect to the spectral features of the optic 10, e.g., a spectral signal of an exterior window of the optic 10.

Figure 2:
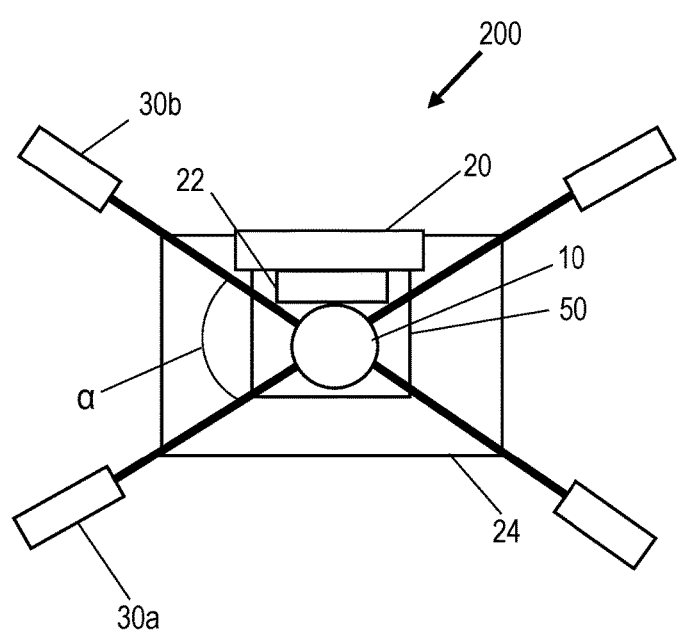
FIG. 2 shows a schematic of a plan view of a further embodiment of the measurement system according to the present disclosure.

According to at least one embodiment of the present disclosure, a measurement system 200 includes a first measuring device 30a and a second measuring device 30b, as shown in FIG. 2. In such an embodiment, other elements of the measurement system 200 may be identical to the measurement system 100 of FIG. 1, for example, the translation stage 20 with the platform 22 and the base 24 upon which the reference material 50 rests. Similarly, the optic 10 to be measured may be connected to the spectrometer 300 and the controller 40 (not shown in FIG. 2). However, in such an embodiment, the controller 40 may be configured differently to operate and communicate with the second measuring device 30b, as described further herein.

The first measuring device 30a and the second measuring device 30b may be identical, or they may be different, e.g., having different measurement ranges. The first and second measuring devices 30a, 30b may be arranged in different planes at an angle α to each other. In certain embodiments, the angle α may be 90° or an angle less than 90°. The first measuring device 30a may be selected and configured to measure an initial gap between the surface of the reference material 50 and the distal tip 14 of the optic 10 (e.g., at a starting position or point), and the second measuring device 30b may be selected and configured to measure a final gap between the surface of the reference material 50 and the distal tip 14 of the optic 10 when the focal distance has been determined. In a further embodiment, the second measuring device 30b may be capable of both the initial gap and final gap measurements for probes having relatively long focal distances, and the first measuring device 30a may be capable of measuring only the final gap for relatively short focal distance probes, while using the second measuring device 30b for the initial gap measurement of such relatively short focal distance probes. The measurement system 200, including the first and second measuring devices 30a, 30b, may be advantageous for measuring different probes collectively having a wide range of focal distances.

In embodiments of the present disclosure in which the optic 10 is intended for Raman spectroscopy, the focal distance (e.g., focal length) of the optic 10 in assembly is critical. Because the inelastically scattered, Raman signal is relatively weak, proper focus of the optic 10 at or about the nominal design focal point or area is required to maximize the strength, and thereby effect, of the excitation light and to maximize the strength of the Raman signal (e.g., the signal-to-noise ratio, SNR) within the collected light. Moreover, poor optic focus may cause chromatic and/or spherical aberration of the signal, by which longer wavelengths within the signal decrease in intensity out of proportion with the shorter wavelengths, which may result in a distortion of band intensity ratios or band area ratios between reference bands within a measurement spectrum from the optic 10. By way of non-limiting example, embodiments of the optic 10 having relatively short focal distances may include a specified nominal focal distance range of 25-250 μm (about 0.001-0.010 in.). Embodiments of the optic 10 having relatively long focal distances may include a specified nominal focal distance range of 2500-5600 μm (about 0.10-0.22 in.).

Figure 5:
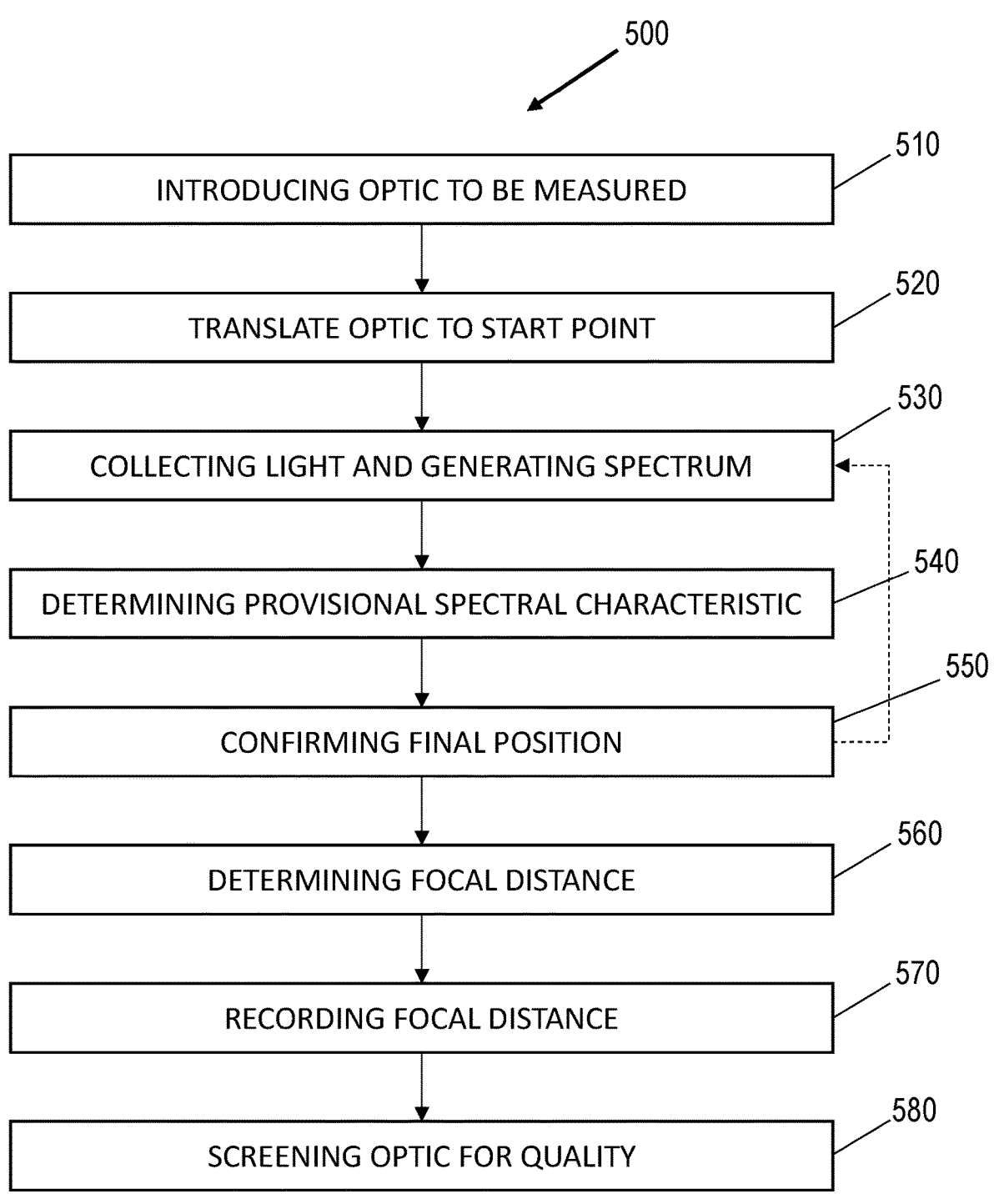
FIG. 5 shows a method for measuring a focal distance of a probe to be measured according to the present disclosure.

A further aspect of the present disclosure includes a method of measuring the focal distance of an optic (e.g., an end optic) using the measurement system 100 according to the present disclosure. Such a method 500 is shown in FIG. 5. The method 500 and its embodiments may be performed to verify the quality, e.g., proper function, of the probe as part of a manufacturing process of the probe or of a failure analysis, as solely non-limiting examples.

According to one embodiment of the present disclosure, the method 500 may include a step 510 of providing the measurement system 100, as shown in FIG. 1. The step 510 includes introducing the optic 10 to be measured into the translation stage 20 and securing the optic 10 therein. The method 500 includes a step 520 of translating the optic 10 along the axis 25 via the platform 22 to a start point, which defines a distance between the optic 10 and the reference material 50. The start point may be selected such that the optic 10 is out of focus such that the gap 38 between the distal tip 14 of the optic 10 and the surface of the reference material 50 disposed on the base 24 of the translation stage 20 is greater than or lesser than the nominal design focal distance. In at least one embodiment, the start point is selected such that the gap 38 is greater than the nominal design focal distance. Such an embodiment may ensure the optic 10 does not inadvertently collide with the reference material 50 or base 24 while translating to or from the start point.

The start point may be identified by measuring the gap 38 between the distal tip 14 of the optic 10 and an incident surface of the reference material 50 disposed on the base 24 of the translation stage 20, where the start point coincides with a specified gap distance therebetween. The gap 38 may be measured continually while the optic 10 is translated until reaching the start point, which position defines an initial gap for the controller 40. In at least one embodiment, the gap 38 is measured using the measuring device 30, which continually communicates measured values of the gap 38 to the controller 40.

The method 500 further includes a step 530 of, upon reaching the start point, transmitting excitation light L0 from the light source 1 of the spectrometer 300 via the fiber 18 and through the optic 10 onto the incident surface of the reference material 50 such that measurement light L1 is scattered, emitted, and/or absorbed from the reference material 50. The step 530 further includes collecting the measurement light L1 with the optic 10 and conveying the measurement light L1 to the spectrometer 300 via the fiber 18. Whether the measurement light L1 collected by the optic 10 is scattered, emitted, and/or absorbed depends on the type of spectroscopy for which the spectrometer 300 and the optic 10 are configured and for which the method 500 is accordingly applicable.

The step 530 further includes generating a measurement spectrum $I(\lambda)$ of the collected measurement light L1. In the case where the optic 10 to be measured is a Raman optic operable for Raman spectroscopic analysis, the measurement light L1 includes a Raman signal (e.g., the measurement signal LR in FIG. 3). Because the measurement light L1 may include elastically scattered (Rayleigh) light, either the optic 10 or the spectrometer 300 may include the filter 5, which is configured to filter the measurement signal LR included in measurement light L1 collected from the reference material 50. The measurement signal LR is then processed using the spectrometer 300 to generate the measurement spectrum $I(\lambda)$ from spectral intensities across wavelengths of the measurement range, as described with respect to FIG. 3, and a spectral characteristic of the measured intensity spectra, e.g., the measurement spectrum $I(\lambda)$, is determined. The generating of the measurement spectrum $I(\lambda)$ may include spectrally dispersing and detecting the measurement signal LR (or measurement light L1) using the disperser 9 and detector 11 of the spectrometer 300, respectively, and generating the measurement spectrum $I(\lambda)$ of the detected spectral intensities of the measurement signal LR.

The step 530 may further include determining the spectral characteristic of the measurement spectrum $I(\lambda)$ by analysis, e.g., mathematical analysis, of the measurement spectrum $I(\lambda)$ at a current position of the optic 10 (e.g., a current spectral characteristic). One of ordinary skill in the art of the present disclosure knows and comprehends suitable analytic mathematical tools and techniques for determining the spectral characteristic from the data (e.g., spectral intensities) of the measurement spectrum $I(\lambda)$. Separate from tools and techniques for calculating it, determining the spectral characteristic may include comparing a determined value of the spectral characteristic at the current position of the optic 10

(e.g., a current incremental step) with a previous determined value of the spectral characteristic. For example, when the current determined value continues to increase relative to a previous determined value, for example, where the spectral characteristic is a maximum of the selected spectral feature (e.g., intensity), the optic 10 is translated in the current direction until a reverse trend is observed such that the current determined value decreases relative to the previous determined value. In further embodiments, for example, in which the spectral characteristic is a minimum of the selected spectral feature (e.g., band area), the converse may be used to determine the spectral characteristic. In such an embodiment, the optic 10 is translated in the current direction until a reverse trend is observed such that the current determined value increases relative to the previous determined value.

The method 500 further includes a step 540 of translating the optic 10 along the axis 25 via the platform 22 from the start point while sequentially and repeatedly performing the operations of step 530 until the spectral characteristic is determined. For example, the operations of step 530 of transmitting the excitation light, collecting the measurement light, generating the measurement spectrum, and determining the spectral characteristic are sequentially performed repeatedly until at least a provisional spectral characteristic at a provisional position is determined. In at least one embodiment, the optic 10 may be translated in incremental steps using the linear actuator 28, and at each incremental step, a measurement spectrum $I(\lambda)$ of the reference material 50 is generated, and a current spectral characteristic is determined. For example, in embodiments in which the linear actuator 28 is a stepper motor, the optic 10 may be moved in steps of 10-100 μm, and at each incremental step, the method steps 520 and 530 are sequentially performed.

The method 500 further includes a step 550 of, upon determining (e.g., identifying, calculating, resolving) the provisional spectral characteristic at the provisional position of the optic 10, translating the optic 10 along the axis 25 via the platform 22 in a second direction, opposite to the first direction, using feedback from the spectrometer, to confirm a final position of the optic 10 at which the spectral characteristic is determined, e.g., at or about the provisional position at which the provisional spectral characteristic is reacquired or determined. The step 550 may include translating the optic 10 directly in the second direction to the provisional position without performing steps 530 and 540 en route. For example, in step 540, the optic 10 may be translated passed the provisional position a certain amount in the first direction, e.g., to ensure the provisional spectral characteristic is distinguished (e.g., recognized). Then in step 550, the optic 10 may be returned in the second direction to confirm the provisional position at which the spectral characteristic was determined. The step 550 further may include iterative translating, using feedback from the spectrometer, on either side of the provisional position (e.g., back and forth in the first and second directions) until a final position at which the spectral characteristic is determined is confirmed at least within a prescribed value range or measurement tolerance, for example. The final position may be the same as or different than the provisional position.

Figure 6:
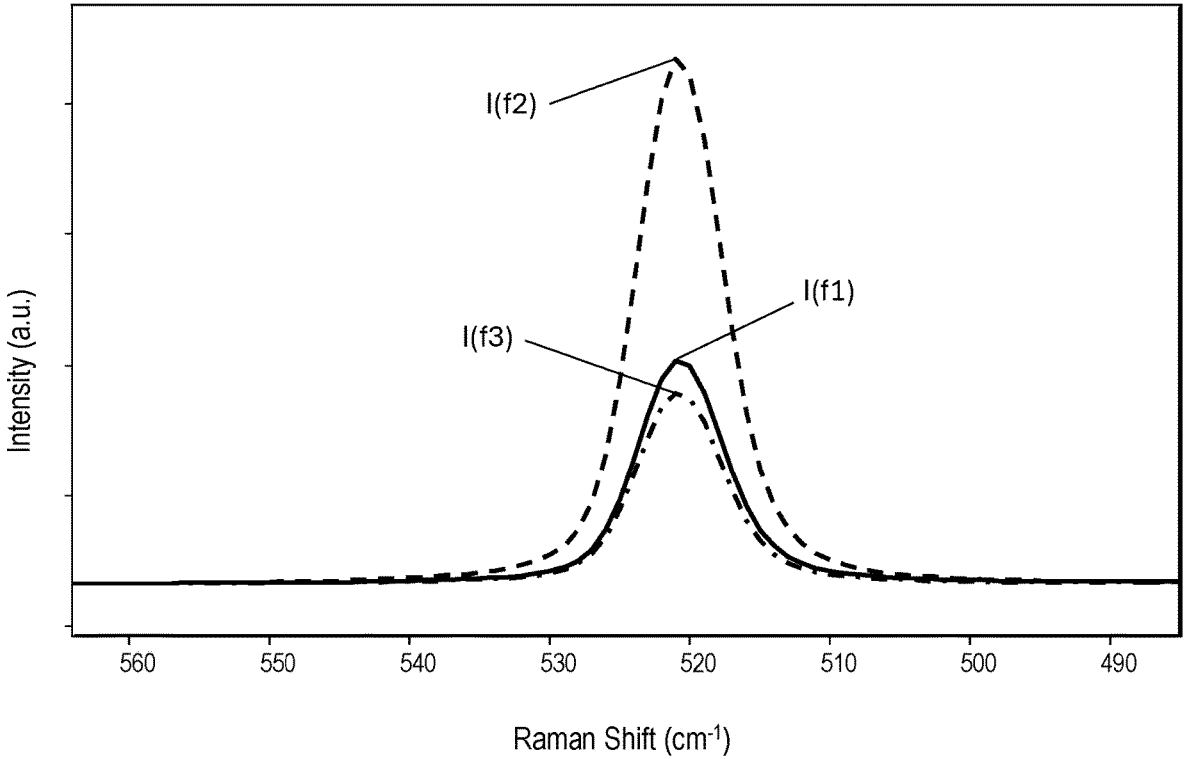
FIG. 6 illustrates exemplary measurement spectra according to a method of the present disclosure as intensity (arbitrary units) by Raman shift ($cm^{-1}$).

FIG. 6 illustrates an exemplary set of measurement spectra for a silicon reference material according to the present disclosure. In the example illustrated in FIG. 6, the spectral characteristic is a maximum intensity (in arbitrary unit for this example) at or about a Raman shift of 520 wavenumbers. As shown, a maximum intensity at the start point I(f1) may be less than a maximum intensity at the true focal distance I(f2). As the optic 10 is translated in the first direction, the maximum intensity may increase, and the maximum intensity at the true focal distance I(f2) will be observed. As the optic 10 is further translated passed the true focal distance, the maximum intensity may decrease to lower maximum intensity value I(f3). Having observed the decrease in I(f3), in this example, the optic 12 may be translated back to the provisional position of I(f2), and the optic 12 translated iteratively about that position until the final position at which the spectral characteristic was determined is confirmed, as described herein.

FIG. 6 illustrates how the same measurement spectra could be used to determine the focal distance where the spectral characteristic is maximum band area. As shown in this example, the area under the curve is greater at the true focal distance I(f2) than at the start point I(f1) or when the gap is lesser than the true focal distance, e.g., the band area is greater for I(f2) relative to I(f1) and I(f3).

In at least one embodiment, the spectral characteristic may be determined using a curve fit of data generated by repeatedly performing operations of the method 300, for example, the steps 530 and 540. In such an embodiment, a first derivative of the fitted curve may be calculated and monitored to identify an inflection point of the fitted curve, at which position is determined to be the provisional position. In further embodiments, the spectral characteristic may be a target value, e.g., a target value selected with respect to the reference material 50 and its spectral features at a given wavelength of the excitation light L0.

In embodiments in which the linear actuator 28 is a stepper motor, the incremental steps of method step 550 may be smaller than the incremental steps of the method step 540. For example, in at least one embodiment, the steps of method step 550 may be 25% or 33% the distance of the steps of method step 540 (as a non-limiting example, 150-200 μm compared to 50 μm). Such an embodiment enables a finer resolution of the final position determination while shortening an overall cycle time of the method 500 by more quickly determining the provisional position.

The method 500 further includes a step 560 of, upon determining the spectral characteristic at the final position of the optic 10, determining the focal distance of the optic 10 based on a final gap between a distal tip of the probe and the surface of a reference material at which the spectral characteristic is determined. The step 560 may include a direct measurement of the final gap or a calculation of the final gap.

In embodiments including direct measurement, the step 560 includes measuring the final gap using the measuring device 30 to directly measure the distance between the distal tip 14 of the optic 10 from the opposing surface of the reference material 50 when the optic 10 is at the final position as determined by the spectral characteristic. For example, referring to the embodiment of the measurement system 100 as shown in FIG. 1, the step 560 may include using the measuring device 30 to measure the final gap. In certain embodiments, both the initial gap and the final gap may be measured by the same measuring device 30. In such an embodiment, the measuring device 30 may be configured with sufficient range to measure distances greater than the start point (e.g., the initial gap) for both short and long focal distance constructions of the optic 10 and to measure the final gap for both short and long focal distance constructions.

In a further example, referring to the embodiment of the measurement system 200 as shown in FIG. 2, the step 560 may include using the second measuring device 30b to measure the final gap directly. Such an embodiment may be advantageous for probes to be measured having relatively long focal distances. In such an embodiment, the second measuring device 30b may be operable to further measure the initial gap directly for both short and long focal distance constructions of probes to be measured. Further, in such an embodiment, the measuring device 30a may be operable to measure the final gap directly for only short focal distance constructions of probes to be measured.

In at least one embodiment of the method 500, the final gap is measured directly using the measuring device 30; however, the initial gap, which defines the start point, is not measured. In such an embodiment, an operator may set the initial gap manually, e.g., by manual control of the linear actuator. Such an embodiment simplifies the measurement system 100 but may increase a risk of damaging the probe under test if misadjusted.

According to at least one embodiment of the present disclosure, the step 560 may include determining the final gap based on the initial gap at the start point, which is measured directly, e.g., using the measuring device 30, and on a net travel distance of the optic 10 via the platform 22 from the start point during the performing of the method steps 540 and 550. In such an embodiment, the net travel distance is calculated from the start point by adding or subtracting movements of the platform 22 about the start point, e.g., using the controller 40. In embodiments of the measurement system 100 in which the linear actuator 28 is a stepper motor, the controller 40 may count steps taken by the stepper motor during the performing of the method steps 540 and 550, and the steps are converted into the net travel distance according to the resolution of the stepper motor. As an example, steps away from the start point may counted as a positive value, steps toward the start point may be counted as a negative value, and the net travel distance is determined by calculating a net quantity of steps of the stepper motor taken from the start point to the final gap. Such an embodiment enables use of the measurement system 100, having a single, relatively low-range, low-cost measuring device 30, to measure the focal distance of both short and long focal distance constructions of probes to be measured.

The method 500 may include a step 570 of, upon determining the focal distance of the optic 10, recording the focal distance in a memory of the controller 40. In certain embodiments, recording the focal distance may include recording the focal distance with a reference index associated with the optic 10. For example, the focal distance with reference index may be recorded in a table, e.g., by auto-populating a spreadsheet stored in the memory. As a non-limiting example, the reference index may be a serial number of the particular probe under test.

The method 500 may include a step 580 of screening the probe under test by comparing the determined focal distance to a specified focal range for the probe. When the determined focal distance is beyond the specified range, a message may be generated alerting an operator or a process control system to reject the probe. Likewise, when the determined focal distance is within the specified range, a message may be generated alerting an operator or the manufacturing system to accept the probe. The step 580 may include generating a message to alert the operator or process control system to reject the probe under test when the spectral characteristic is not identified (e.g., determined) before the distal tip 14 of the optic 10 is within a minimum distance from the reference material 50. For example, the minimum distance may be a lower bound of the specified focal range or some margin beyond the lower bound. Such an embodiment may ensure the probe under test is not damaged, e.g., by colliding with the reference material 50 or base 24, and further production time is not wasted on a defective probe.

The measurement systems and methods of the present disclosure may be employed to check the quality of optics, and more generally probes, in a manufacturing process, e.g., at the end of an assembly process, as an aspect of a quality control process. Further, the measurement systems and methods of the present disclosure may be employed to facilitate the assembly process by informing an operator of manufacturing adjustments to be applied to a probe during assembly thereof, e.g., adding shims between optical components of a probe in fabrication or machining tolerancing features of the probe.

While various embodiments of a measurement system for a focal distance measurement of an optical probe and methods for using and constructing the same have been described in considerable detail herein, the embodiments are merely offered by way of non-limiting examples of the disclosure described herein. It will therefore be understood that various changes and modifications may be made, and equivalents may be substituted for elements thereof, without departing from the scope of the disclosure. The present disclosure is not intended to be exhaustive or to limit the scope of the subject matter of the disclosure.

Further, in describing representative embodiments, the disclosure may have presented a method and/or process as a particular sequence of steps. However, to the extent that the method or process does not rely on the particular order of steps set forth herein, the method or process should not be limited to the particular sequence of steps described. Other sequences of steps may be possible and thus remain within the scope of the present disclosure.

The invention claimed is:

1. A measurement system for a focal distance measurement of an optic to be measured, the measurement system comprising:

a translation stage including a stationary base and a platform configured to translate relative to each other and connected via a guide such that the platform is restricted to linear motion relative to the base along an axis of the guide, wherein the translation stage further includes a linear actuator configured to move the platform along the axis in an automated manner;

a reference material disposed on the base of the translation stage and having a surface opposite the optic to be measured;

a measuring device configured to measure a gap between the surface of the reference material and a distal tip of the optic to be measured in an automated manner, wherein the measuring device includes a first optical micrometer operable to generate a first light curtain between a first light source unit and a first receiver unit disposed on opposing sides of the translation stage, the first optical micrometer configured such that a first portion of the first light curtain intersects the reference material and the optic, wherein the first receiver unit is configured to measure an initial gap from a second portion of the first light curtain, which is incident on the first receiver unit;

a spectrometer in optical communication with the optic and configured to transmit monochromatic excitation light via the optic; and a controller configured to operate the translation stage, the measuring device, and the spectrometer and to determine a focal distance of the optic based on a spectral characteristic of a measurement spectrum of the reference material generated by the spectrometer in response to the excitation light and on a final gap between the surface of the reference material and the distal tip of the optic at which the spectral characteristic is determined.

2. The measurement system according to claim 1, wherein the spectral characteristic is based on at least one of a maximum intensity, a band peak ratio, a band area, and a band area ratio.

3. The measurement system according to claim 1, wherein the controller is configured to determine the final gap based on the initial gap between the surface of the reference material and the distal tip of the optic, which initial gap defines a start point, and on a net travel distance of the platform from the start point.

4. The measurement system according to claim 1, wherein the controller is configured to determine the final gap based on a measured value of the measurement measuring device.

5. The measurement system according to claim 1, wherein the measuring device includes a second optical micrometer arranged in the same plane as, but at an angle to, the first optical micrometer, the second optical micrometer operable to generate a second light curtain between a second light source unit and a second receiver unit disposed on opposing sides of the translation stage, wherein the second light curtain is at the angle relative to the first light curtain, wherein the second optical micrometer is configured such that a first portion of the second light curtain intersects the reference material and the optic, wherein the second receiver unit is configured to determine the final gap from a second portion of the second light curtain, which is incident on the second receiver unit, and from the initial gap.

6. The measurement system according to claim 1, wherein the linear actuator is a stepper motor, and wherein the controller is configured to determine the net travel distance by calculating a net quantity of steps of the stepper motor taken from the start point to the final gap.

7. The measurement system according to claim 6, wherein the linear actuator is operable to an accuracy of 5 microns ($\mu$m) such that the determined focal distance is accurate within 12.5 $\mu$m.

8. The measurement system according to claim 1, wherein the translation stage is configured with one degree of freedom.

9. A method for measuring a focal distance of an optic in an automated manner, the method comprising:

providing the measurement system according to claim 1;

translating the optic to be measured via the platform to a start point, wherein the start point defines an initial gap between the distal tip of the optic and the surface of the reference material;

transmitting monochromatic excitation light onto the surface of the reference material such that measurement light is scattered, emitted, and/or absorbed from the reference material;

collecting at least a portion of the measurement light, conveying the collected measurement light to the spectrometer, and generating a measurement spectrum of the collected measurement light;

translating the platform in a first direction using feedback from the spectrometer while sequentially and repeatedly transmitting the excitation light, collecting the measurement light, and generating the measurement spectrum until a prescribed spectral characteristic of the measurement spectrum is determined;

translating the platform in an opposite, second direction using feedback from the spectrometer until the spectral characteristic is determined in the second direction; and determining the focal distance of the optic based on a final gap between the distal tip of the optic and the surface of the reference material at which the spectral characteristic is determined.

10. The method according to claim 9, wherein the spectral characteristic is based on at least one of a maximum intensity, a band peak ratio, a band area, and a band area ratio.

11. The method according to claim 9, further comprising determining the final gap based on the initial gap at the start point and on a net travel distance of the platform from the start point.

12. The method according to claim 9, wherein the linear actuator of the translation stage is a stepper motor configured to translate the optic via the platform in incremental steps, and wherein the net travel distance is calculated by counting a net quantity of steps of a stepper motor taken from the start point to the final gap in the first direction relative to the second direction.

13. The method according to claim 12, wherein the incremental steps are larger in the first direction than in the second direction.

14. The method according to claim 9, wherein the start point is specified and is determined by measuring the initial gap using the measuring device.

15. The method according to claim 9, wherein the start point is selected to be greater than a design nominal focal distance of the optic.

16. The method according to claim 9, wherein the start point is selected such that the first direction is toward the base of the translation stage.

17. The method according to claim 9, wherein the start point is selected such that the first direction extends away from the base of the translation stage.

18. The method according to claim 9, further comprising:

comparing the determined focal distance to a specified focal range for the optic; and generating a message when the determined focal distance is beyond the specified range.

19. The method according to claim 9, further comprising generating a message when the determined focal distance is within the specified range.

20. The method according to claim 9, further comprising recording the determined focal distance of the optic.

21. A computer program product for operating the measurement system of claim 1, the computer program product comprising a non-transitory machine-readable storage medium encoding instructions that, when executed by one or more programmable processors of the controller, cause the one or more programmable processors to perform operations comprising:

translating the optic to be measured via the platform to a start point;

transmitting monochromatic excitation light onto the surface of the reference material such that measurement light is scattered, emitted, and/or absorbed from the reference material;

collecting at least a portion of the measurement light, conveying the collected measurement light to the spectrometer, and generating a measurement spectrum of the collected measurement light;

translating the platform in a first direction using feedback from the spectrometer while sequentially and repeatedly transmitting the excitation light, collecting the measurement light, and generating the measurement spectrum until a prescribed spectral characteristic of the measurement spectrum is determined;

translating the platform in an opposite, second direction using feedback from the spectrometer until the spectral characteristic is determined in the second direction; and determining the focal distance of the optic based on a final gap between the distal tip of the optic and the surface of the reference material at which the spectral characteristic is determined.

22. The measurement system according to claim 1, wherein the measurement spectrum is a Raman spectrum of inelastic scattering light from the reference material.

\* \* \* \* \*